United States Patent [19]

Kashiwagi et al.

[11] Patent Number: 5,634,042
[45] Date of Patent: May 27, 1997

[54] DATA TRANSFER APPARATUS THAT COMPENSATES FOR DIFFERENTIAL SIGNAL DELAYS

[75] Inventors: Kenji Kashiwagi, Minamiashigara; Sigeru Kaneko, Hadano; Toshitsugu Takekuma, Ebina, all of Japan

[73] Assignee: Hitachi, Ltd., Tokyo; jpx

[21] Appl. No.: 365,005

[22] Filed: Dec. 28, 1994

[30] Foreign Application Priority Data

Dec. 28, 1993 [JP] Japan .................................. 5-334614

[51] Int. Cl.⁶ .............................. G06F 1/06; G06F 13/00
[52] U.S. Cl. ..................... 395/550; 395/494; 395/880
[58] Field of Search ........................ 395/550, 494, 395/880, 556

[56] References Cited

U.S. PATENT DOCUMENTS

| | | | |
|---|---|---|---|
| 4,931,986 | 6/1990 | Daniel et al. | 364/DIG. 2 |
| 5,280,587 | 1/1994 | Shimodaira et al. | 395/550 X |
| 5,452,436 | 9/1995 | Arai et al. | 395/550 |
| 5,479,646 | 12/1995 | Proebsting | 395/494 |

*Primary Examiner*—Thomas M. Heckler
*Attorney, Agent, or Firm*—Fay, Sharpe, Beall, Fagan, Minnich & McKee

[57] ABSTRACT

A data transfer apparatus transfers data between a source and a destination on a clock having a phase with a signal delay over a connection line taken into account to allow a plurality of destinations to capture the transfer data on the same clock timing. Optimized data transfer and high-speed data transfer are thus realized, which in turn significantly enhances the performance of the data transfer apparatus.

23 Claims, 5 Drawing Sheets

DATA TRANSFER APPARATUS THAT COMPENSATES FOR DIFFERENTIAL SIGNAL DELAYS

BACKGROUND OF THE INVENTION

1. Field of the Invention

The present invention relates to data transfer apparatuses, and, more particularly, to data transfer apparatuses designed with consideration given to signal delays over data signal lines.

2. Description of the Related Art

Recent increases in computer processing speed require a faster data transfer rate in data transfer apparatuses. Generally, however, the longer the signal line between a data sending unit and a data receiving unit, the greater the signal delay over the signal line. This signal delay represents overhead that cannot be ignored in a data transfer operation over the signal line. Thus, a data transfer circuit incorporating the signal line must be designed with the delay time taken into account.

Figure 6:
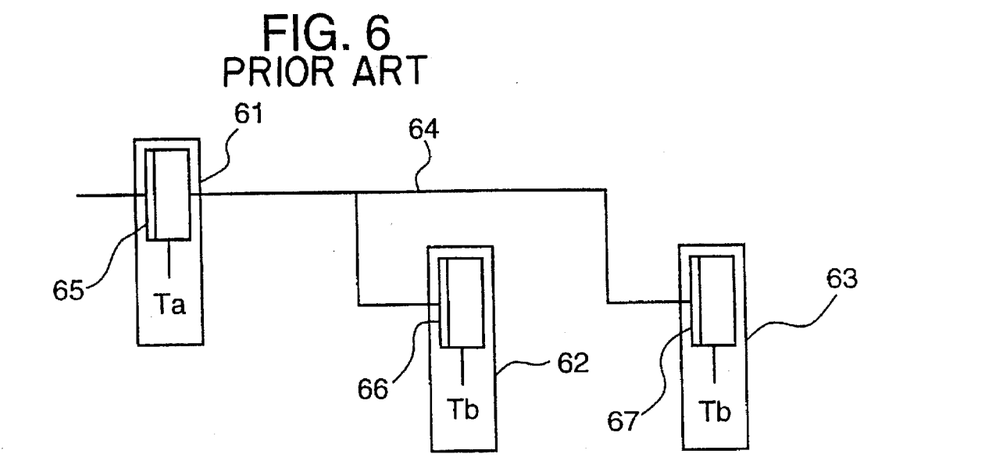
FIG. 6 is a block diagram illustrating a data transfer apparatus suffering from a problem of the prior art.

Referring to FIG. 6, a block diagram is shown that illustrates a prior art problem of conventional data transfer apparatuses. A data sending unit 61 transfers data to data receiving units 62 and 63, which may be memory modules for example, via a bus signal line 64. The data from the data sending unit 61 are sent from a flip-flop circuit 65 on a clock Ta. Upon receipt of a clock Tb, a flip-flop circuit 66 of the data receiving unit 62 and a flip-flop circuit 67 of the data receiving unit 63 capture the data.

Figure 7:
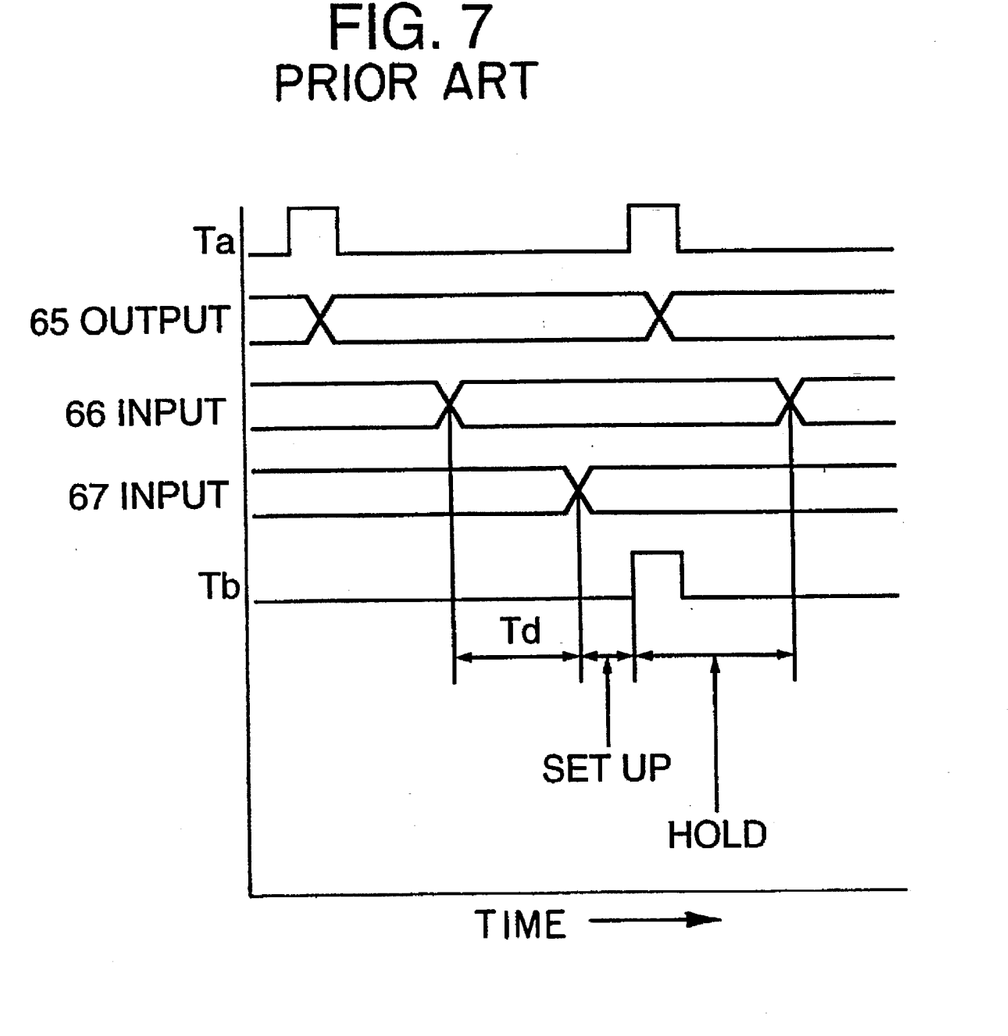
FIG. 7 is a timing chart illustrating operational timings of the data transfer apparatus of FIG. 6.

FIG. 7 shows a timing chart illustrating operational timings of the above-mentioned prior art technology. As shown in the figure, there is a delay time Td between the moment when the data are received by the flip-flop circuit 66 and the moment when the data are received by the flip-flop circuit 67. The delay is caused by a difference in the lengths of the wirings running from the data sending unit 61 to the data receiving unit 62, and from the data sending unit 61 to the data receiving unit 63.

Consequently, a clock Tb, which is generated with consideration given to the setup time of an input to the flip-flop circuit 67 from arrival to capture of data, is applied to data inputs of the data receiving units 62 and 63 containing the flip-flop circuits 66 and 67, respectively, to capture the data. Thus, the data transfer apparatus of FIG. 6 is designed by taking into account the difference Td between delay times for the capture clock pulses of the receiving side.

However, since this conventional technique performs synchronized data transfer, the speed of the data transfer interval is constrained by the delay caused by the spatial difference between mounting positions of the sending and receiving units. That is, the data transfer can be completed no faster than the time necessary to transfer between the most distant sending and receiving units.

SUMMARY OF THE INVENTION

Therefore, an object of the present invention is to provide a clock phase shifting scheme intended to minimize increases in the data transfer interval due to the transfer time difference between each of plural receiving units and a sending unit.

In carrying out the invention and according to one aspect thereof, a data transfer apparatus transfers data over a signal line to a plurality of controlled data transfer destinations. The data transfer apparatus can generate any of a plurality of clocks having phases slightly differentiated from each other

2 by passing an input clock as is or through at least one delay element, and selects one of the available plurality of clocks, by which the data are transferred to a corresponding data transfer destination according to the selected clock. In a preferred embodiment, the selected clock is chosen based on the address of the controlled destination for receiving the data.

Thus, in transferring data, the transfer destination signal delay due to the distance from the sending unit to the transfer destination is taken into account based on the address of the transfer destination. Data are sent to the transfer destination in accordance with a clock that is selected to correct the signal delay. Thus, all data transfer destinations receive data at the same timing, enabling the invention to realize faster overall data transfer than the prior art counterpart.

BRIEF DESCRIPTION OF THE DRAWINGS

This invention will be described in further detail by way of example with reference to the accompanying drawings.

DETAILED DESCRIPTION OF THE PREFERRED EMBODIMENTS

Figure 1:
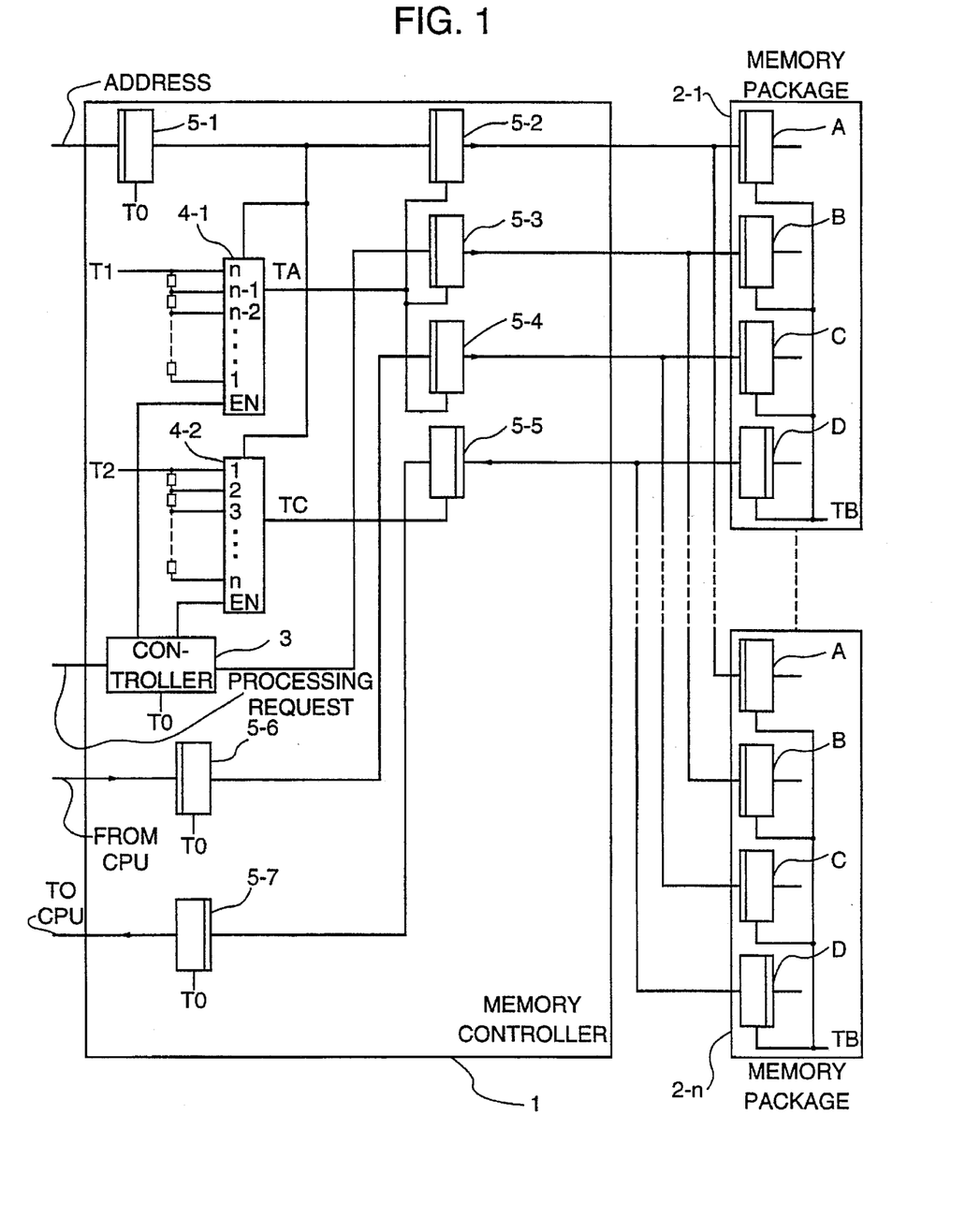
FIG. 1 is a block diagram illustrating a preferred embodiment of the invention.

FIG. 1 shows a block diagram of a preferred embodiment of the present invention. The illustrated memory controller 1 controls the transfer of data to and from memory modules 2-1 through 2-n. The memory module 2-1 is closest to the memory controller 1 and the memory module 2-n is farthest from the memory controller 1, with intermediate memory modules falling in between sequentially. Preferably, these memory modules are controlled by their respective addresses. The memory modules 2-1 through 2-n are each connected to the memory controller 1 by a bus composed of an address signal line, a control signal line, a write data line, and a read data line. In this setup, the length of the bus line connecting the memory module 2-1 to the memory controller 1 is the shortest of the bus lines, while the bus line connecting the memory module 2-n to the memory controller 1 is the longest.

A control circuit 3 receives a processing request from outside the data transfer apparatus, such as from a central processing unit (CPU), to control each portion constituting the memory controller 1. The control circuit 3 also sends a control signal to each of the memory modules 2-1 through 2-n. A send clock selecting circuit 4-1 generates a plurality of clocks having different respective phases by passing a base clock T1 through a plurality of delay elements, selects one of the generated clocks, and outputs the selected clock as a clock TA to a memory module to which data are to be written, the clock being selected by an address of the memory module in the preferred embodiment. A receive clock selecting circuit 4-2 generates a plurality of clocks having different respective phases by passing a base clock T2 through a plurality of delay elements, and outputs one of the generated clocks as an output clock TC to a memory module from which data are to be read, the output operation being made based on an address of the memory module in the preferred embodiment.

A flip-flop circuit 5-1 receives an address of a memory module to or from which data are to be transferred. A flip-flop circuit 5-2 sends the address received from the flip-flop 5-1 to the indicated memory module, a flip-flop circuit 5-3 sends a control signal to the indicated memory module, and a flip-flop circuit 5-4 sends data to the indicated memory module, each upon receipt of a clock pulse of clock TA. Further, a flip-flop circuit 5-5 receives data from a memory module indicated by the address received from flip-flop 5-1 upon receipt of a clock pulse TC, and a flip-flop circuit 5-6 receives data from the CPU to be delivered to the flip-flop circuit 5-4 upon receipt of a clock pulse T0. Finally, a flip-flop circuit 5-7 receives data from the flip-flop 5-5 and sends the data to the CPU upon receipt of the clock T0.

The memory modules 2-1 through 2-n are respectively provided with address signal receiving flip-flop circuits 2-1A through 2-nA, control signal receiving flip-flop circuits 2-1B through 2-nB, data signal receiving flip-flop circuits 2-1C through 2-nC, and data signal sending flip-flop circuits 2-1D through 2-nD. All of these flip-flop circuits are driven by a clock TB, which may be a single clock generator for all of the flip-flop circuits 2-1A through 2-nD, or a plurality of pulse generators providing a synchronized clock TB.

In the above-mentioned setup, when the controller 3 receives a processing request, for example a data write instructing signal, the flip-flop circuit 5-1 receives an address signal and sends it to the send clock selecting circuit 4-1. The send clock selecting circuit 4-1 selects a timing clock TA corresponding to the received address signal and sends the selected timing clock TA to the flip-flop circuits 5-2, 5-3, and 5-4.

If the request for the controller 3 is for reading data from a memory module, the address received by the flip-flop circuit 5-1 is sent to the send clock selecting circuit 4-1 and the receive clock selecting circuit 4-2. The selecting circuits 4-1 and 4-2 respectively output a clock TA and a clock TC corresponding to the address.

Now, referring to the timing charts of FIGS. 2 and 3, operating timings of the components shown in FIG. 1 will be described in more detail.

Figure 2:
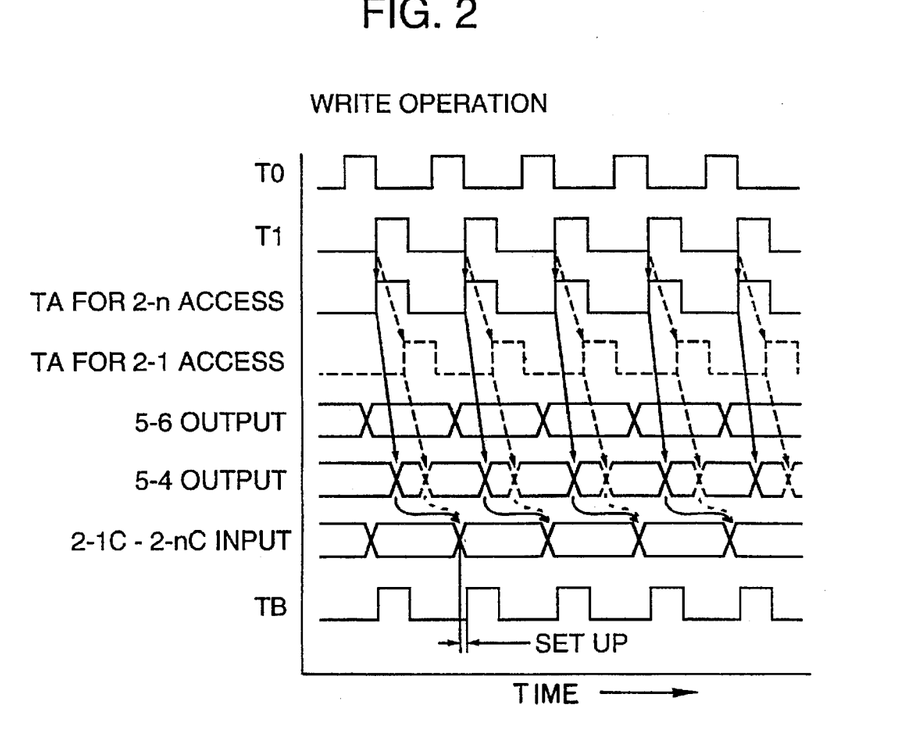
FIG. 2 is a timing chart illustrating a data write operation of the embodiment of FIG. 1.

FIG. 2 shows a chart of timings according to which data are transferred, or written, from the memory controller 1 to the memory modules 2-1 through 2-n, by way of example.

In FIG. 2, when a write request comes to the controller 3 from a CPU, for example, an address carried by the request is sent to the selecting circuit 4-1 through the flip-flop circuit 5-1. A data signal coming from the CPU is sent to the flip-flop circuit 5-4 through the flip-flop circuit 5-6. The selecting circuit 4-1 outputs a clock signal TA with its phase shifted according to the address signal. On receiving the clock TA, the address signal is sent from the flip-flop circuit 5-2 to a memory module to which the data are to be transferred according to the address, a control signal is sent from the flip-flop circuit 5-3 to the memory module, and the data signal is sent from the flip-flop circuit 5-4 to the memory module.

For example, if data are to be transferred to the memory module 2-n, the selecting circuit 4-1 selects a clock that corresponds to the memory module 2-n. As shown in FIG. 1, the memory module 2-n is located farthest away from the memory controller 1 and, therefore, the bus connecting the module and the controller is the longest of the buses connecting the memory controller and the memory modules. Consequently, the signal delay over the bus to the memory module 2-n is the greatest of all of the signal delays over the buses. Thus, at this time, the selecting circuit 4-1 outputs a clock T1 with the highest speed (fewest delays) as the clock TA.

On the other hand, if the address sent to the selecting circuit 4-1 corresponds to a memory in the memory module 2-1, the signal delay is the smallest, unlike the signal delay of the memory module 2-n. Consequently, the selecting circuit 4-1 outputs the input clock T1 at a lowest speed (most delays). That is, the selecting circuit selects, as the output clock TA, a clock whose phase is shifted sufficiently to compensate for the signal delay of the data signal line from the flip-flop circuit 5-4 to a flip-flop circuit 2-nC in the above-mentioned memory module 2-n.

Thus, in the selecting circuit 4-1, based on the entered address, a clock TA is selected with the signal delay over the signal line between the memory controller 1 and each memory module taken into account. The flip-flop circuits 5-2, 5-3, and 5-4 transmit data to each memory module by this clock TA.

The clock of the output signal can be adjusted by the above-mentioned setup to allow the flip-flop circuits in all memory modules to receive and capture data at the same clock timing. This technique ensures uninterrupted data transfer at a faster overall rate than can be attained by the conventional counterpart.

Figure 3:
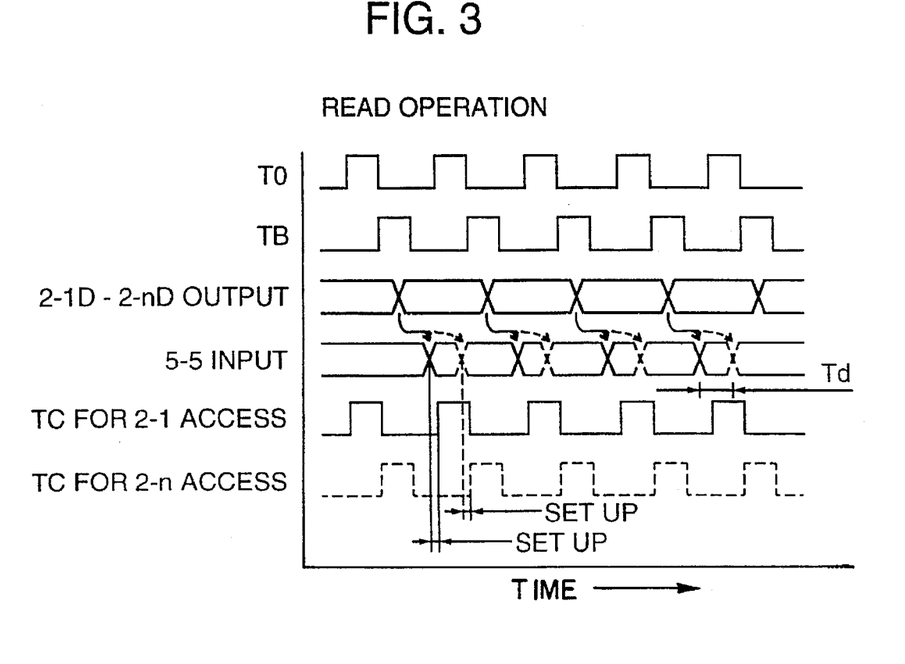
FIG. 3 is a timing chart illustrating a data read operation of the embodiment of FIG. 1.

FIG. 3 shows an example of clock operating timings in which data are transferred, or read, from the memory modules 2-1 through 2-n to the memory controller 1.

When a read request comes from the CPU to the controller 3, the flip-flop circuit 5-1 receives an address carried by the request. The received address is sent to the selecting circuit 4-1 and the selecting circuit 4-2. Based on the address, the selecting circuit 4-1 outputs the clock TA and the selecting circuit 4-2 outputs the clock TC. These clock signals are shifted in phase, as necessary, by one or more delay elements in the same manner as for the write operation.

In the read operation, a clock corresponding to the address is selected for the clock TA as with the write operation. Driven by the clock TA, the flip-flop circuit 5-2 outputs an address signal and the flip-flop circuit 5-3 outputs a control signal to read data from a memory module having the address specified by the read request. Read data prepared in each of memory packages 2-1 through 2-n are transmitted from flip-flop circuits 2-1D through 2-nD on a clock TB.

In the memory controller 1, if the address for read data indicates the memory module 2-1, for example, the signal delay between the memory module 2-1 and the memory controller 1 is the smallest of all of the memory modules in the embodiment. In this case, the selecting circuit 4-2 selects, for an input clock T2, the fastest clock (that is, the clock that has not passed through a delay element), and outputs it as the clock TC.

If the address for read data indicates the memory module 2-n, separated farthest from the memory controller 1, the signal delay is taken into account to select a clock obtained by passing it through a suitable number of delay elements. The clock is then output as the clock TC.

Thus, the selecting circuit 4-2 outputs to the flip-flop circuits the clock TC obtained by shifting the phase of the input clock T2 according to the delay over the signal line connecting the addressed memory module to the memory controller 1.

This constitution minimizes the setup time for reading data from the memory modules, and minimizes the data transfer interval caused by the delay time difference, thereby realizing relatively high-speed data transfer processing.

Figure 4:
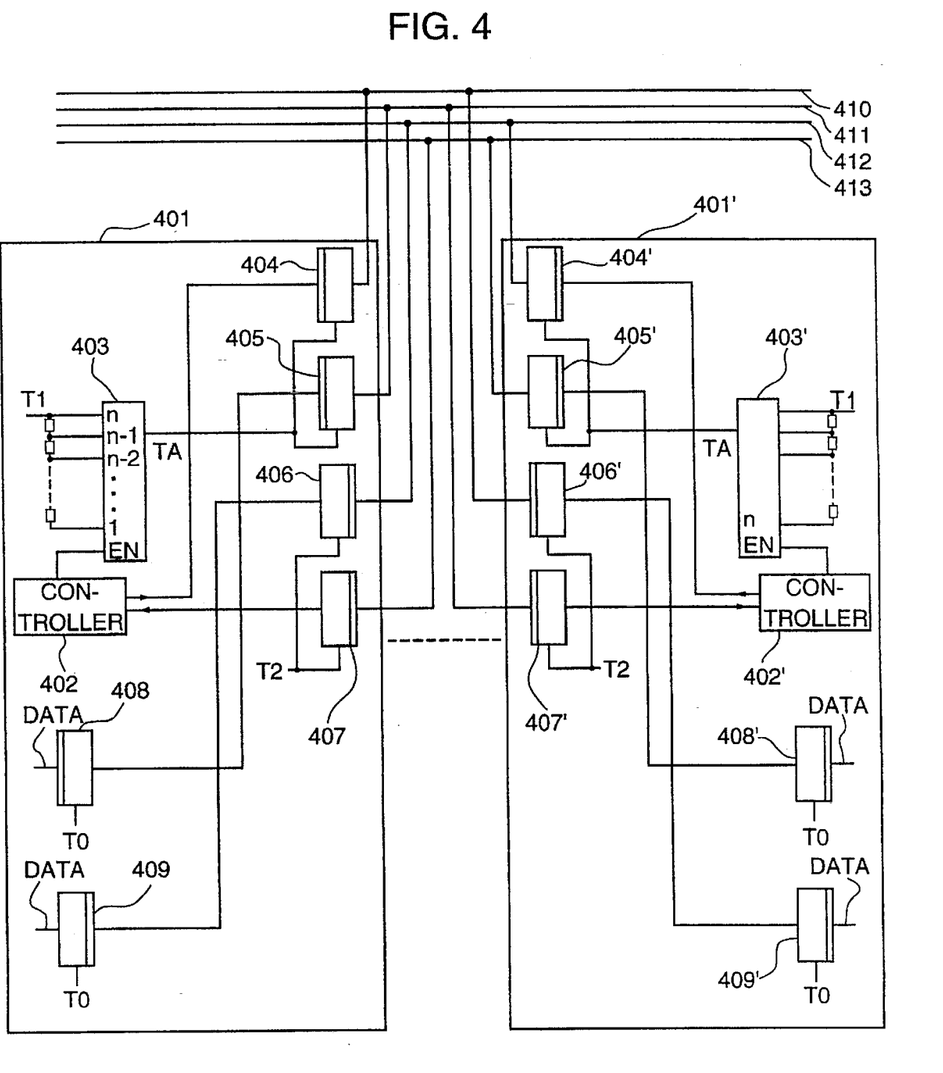
FIG. 4 is a block diagram illustrating another preferred embodiment of the invention.

The present invention is also applicable to the following data transfer processing embodiment. FIG. 4 is a block diagram illustrating a plurality of units each having data sending and receiving portions, for example. In the figure, units 401, 401' respectively have controllers 402, 402' for receiving a processing request and controlling other portions of the unit, and selecting circuits 403, 403', each for selecting a clock T1 from a plurality of clocks having different phases caused by a plurality of delay elements according to address signals coming from the controllers 402, 402'. The selecting circuits 403, 403' each supply the selected clock to part of a respective unit as a timing clock TA. Flip-flop circuits 404, 404' hold control signals to be sent to the opposing unit (i.e., 401', 401, respectively), flip-flop circuits 405, 405' send data to the opposing unit, and flip-flop circuits 406, 406' receive and hold the data coming from the opposing unit. The units 401, 401' further include flip-flop circuits 407, 407' for receiving and holding the control signal coming from the opposing unit, flip-flop circuits 408, 408' for holding data requested by the controller for transmission at the time of data transmission, and flip-flop circuits 409, 409' for holding data received from the opposing unit via flip-flop circuits 406, 406'. These units are connected to each other with a bus consisting of a plurality of signal lines such as control signal lines 410 and 413 and data lines 411 and 412.

The above-mentioned flip-flop circuits 404, 404' and 405, 405' each output the control signal and the data, respectively, by the clock TA output from the selecting circuits 403, 403'. The above-mentioned input flip-flop circuits 406, 406' and 407, 407' each operate on a clock T2.

In the above-mentioned circuit constitution, if a request comes to the unit 401 to send data to the unit 401', for example, the data are delivered to the flip-flop circuit 408 from a memory, for example, that is not shown in the drawing. The flip-flop circuit 408 is driven by T0. Moreover, the controller 402 sends the address of the unit 401' to the selecting circuit 403. The selecting circuit 403 then selects a clock based on the signal delay caused by the positional relationship indicated by the address of the destination unit 401' and the address of the source unit 401. The selected clock is then output as the clock TA.

By way of example, as the difference between the address of the destination unit and the address of the source unit becomes greater, the relative positions of these units are separated farther, thereby increasing the signal delay between the units.

If the address difference is relatively great, then the selecting circuit 403 accordingly selects a relatively fast clock (fewer delays) from a plurality of clocks having different phases, and outputs the selected clock as the clock TA. If the address difference is relatively small, the selecting circuit 403 accordingly selects a relatively slow clock (more delays) from the plurality of clocks having different phases, and outputs the selected clock as the clock TA.

Figure 5:
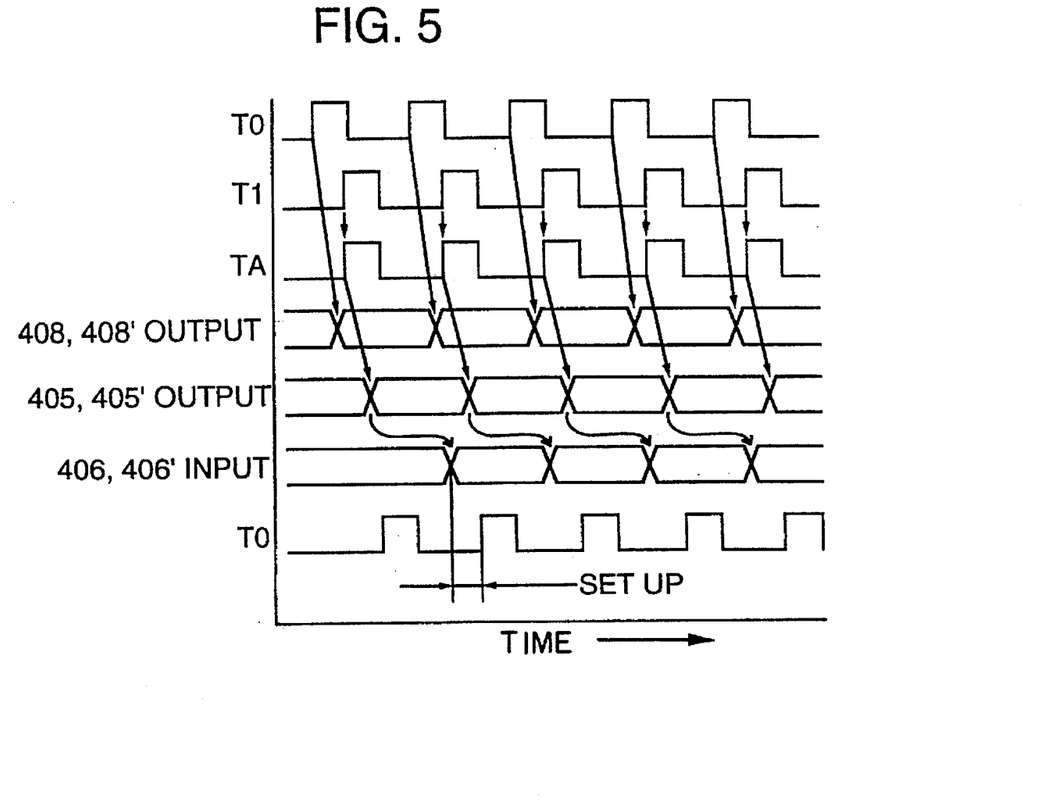
FIG. 5 is a timing chart illustrating a data transfer operation of the embodiment of FIG. 4.

The clock TA is supplied to the flip-flop circuit 404 for sending the control signal and to the flip-flop circuit 405 for sending the data signal. Then, the control signal is supplied from the controller 402 to the flip-flop circuit 404, and the data held in the flip-flop circuit 408 are sent to the flip-flop circuit 405. The control signal and the data are then sent to the destination unit 401' over the respective signal lines. The data signal thus sent is received by the flip-flop circuit 406' of the destination unit 401' and the control signal is received by the flip-flop circuit 407'. Then the control signal is sent to the controller 402' and the data signal to the flip-flop circuit 409'. FIG. 5 shows an example of clock timings illustrating the above-mentioned signal transfer operations for a destination that is farthest from the source.

The transfer data are output from the flip-flop 408 on the clock T0. As indicated in the figure, the source unit 401 and the destination unit 401' of this example are separated from each other most distantly. If the units are also most distant in address, the selecting circuit 403 selects and outputs the fastest clock (that is, the clock T1 is passed through no delay elements) for the clock TA. Thus, the transfer data are output from the flip-flop circuit 405 on the clock TA. On the other hand, the unit 401' receives the transferred data at the flip-flop circuit 406'. The received data are then clocked into the flip-flop circuit 409' on the clock T0.

Thus, regardless of the positional relationship between the source unit and the destination unit, data can be captured always in an optimum setup time by obtaining the signal delay based on the unit addresses, and by then shifting the phase of the output clock based on the obtained signal delay. This constitution assures an uninterrupted data transfer operation at a relatively high speed.

We claim:

1. A data transfer apparatus for transferring data over a signal line to a plurality of data transfer destinations, comprising:

clock generating means for generating and outputting a plurality of clocks having different phases with respect to each other;

clock selecting means for receiving said plurality of clocks generated by said clock generating means, and for selecting one of said clocks for output therefrom; and data sending means for receiving the selected clock and for sending the data according to the selected clock to one of said plurality of data transfer destinations.

2. A data transfer apparatus as claimed in claim 1, wherein the clock selecting means selects one of said plurality of clocks generated by said clock generating means according to an address of said one of said plurality of data transfer destinations.

3. A data transfer apparatus as claimed in claim 2, wherein the phase of each of the plurality of clocks has a direct correspondence to one of the plurality of data transfer destinations, such that phase delays of the phases of the clocks correspond inverse proportionally to a physical distance between the data sending means and the data transfer destinations as indicated by the addresses of the data transfer destinations.

4. A data transfer apparatus as claimed in claim 3, wherein the time elapsing from clock selection by said clock selecting means to reception of data by said one of said plurality of data transfer destinations is constant regardless of data transfer destination.

5. A data transfer control apparatus for sending and receiving data over a signal line to and from a plurality of memory modules, said data transfer control apparatus comprising:

first clock generating means for generating and outputting a first plurality of clocks having different phases with respect to each other;

first clock selecting means for receiving said first plurality of clocks generated by said first clock generating means, and for selecting one of said first plurality of clocks for output therefrom, according to which data are to be written to a memory module;

data sending means for receiving the selected clock and sending the data to be written according to the selected clock;

second clock generating means for generating a second plurality of clocks having different phases with respect to each other;

second clock selecting means for receiving said second plurality of clocks generated by said second clock generating means, and for selecting one of said second plurality of clocks, according to which data are to be read from a memory module; and data receiving means for receiving data read according to the clock selected by said second clock selecting means.

6. A data transfer control apparatus as defined in claim 5, wherein each of said plurality of memory modules includes a circuit for receiving the data to be written and a circuit for sending the read data, and wherein all of said circuits for receiving the data to be written and all of said circuits for sending the read data operate on a common clock.

7. A data transfer control apparatus according to claim 5, wherein said first clock selecting means selects one of said first plurality of clocks generated by said first clock generating means according to an address of the memory module to which data are to be written; and wherein said second clock selecting means selects one of said second plurality of clocks generated by said second clock generating means according to an address of the memory module from which data are to be read.

8. A data transfer control apparatus as claimed in claim 7, wherein the phase of each of the first plurality of clocks generated by said first clock generating means has a direct correspondence to one of the memory modules to which data are to be written; and wherein said first clock selecting means selects one of said first plurality of clocks generated by said first clock generating means according to an address of the memory module to which data are to be written;

such that phase delays of the clocks generated by the first and second clock generating means correspond inverse-proportionally to physical distance between the data sending means and the memory modules to which data are to be written, and between the memory modules from which data are to be read and the data receiving means, respectively.

9. A data transfer control apparatus as claimed in claim 8, wherein the time elapsing from clock selection by said first clock selecting means to reception of data by any of said memory modules to which data are to be written is constant regardless of memory module.

10. A data transfer system in which a plurality of units are connected with each other by a bus line for transferring data, each unit sending and receiving data from another unit by said bus line, said plurality of units each comprising:

clock generating means for generating and outputting a plurality of clocks having different phases;

clock selecting means for receiving said plurality of clocks generated by said clock generating means, and for selecting one of said plurality of clocks for output therefrom; and data sending means for sending data according to the clock selected by said clock selecting means to a receiving unit of said plurality of units other than the unit sending the data.

11. A data transfer system according to claim 10, wherein said clock selecting means selects one of said plurality of clocks generated by said clock generating means according to an address of the unit sending the data and an address of the receiving unit.

12. A data transfer system as claimed in claim 11, wherein the phase of each of the plurality of clocks generated by said clock generating means has a direct correspondence to one of the plurality of units other than the unit generating the clock, such that phase delays of the phases of the clocks correspond inverse-proportionally to physical distances between the data sending means and each of the plurality of units other than the unit sending the data.

13. A data transfer system as claimed in claim 12, wherein time elapsing from clock selection by said clock selecting means to reception of data by said receiving unit is constant regardless of receiving unit.

14. A data transfer system as claimed in claim 11, wherein each unit further includes data receiving means for receiving data sent by data sending means from a unit other than the unit receiving the data.

15. A data transfer apparatus for sending and receiving data over a signal line, comprising:

a send clock determining circuit for receiving information representing an address to which send data are to be transmitted by the data transfer apparatus, and for determining a clock timing according to which the send data are to be transmitted by the data transfer apparatus based on the received information;

a receive clock determining circuit for receiving information representing an address from which receive data are to be received by the data transfer apparatus, and for determining a clock timing according to which the receive data are to be received by the data transfer apparatus based on the received information; and a controller for receiving an external processing request and for providing an enable signal to one of the send clock determining circuit and the receive clock determining circuit in response to the external processing request.

16. A data transfer apparatus according to claim 15, further comprising:

a first clock generating circuit for generating and outputting a first plurality of clocks having different phases with respect to each other, wherein said send clock determining circuit selects one of said first plurality of clocks generated by said first clock generating circuit according to the information representing the address to which the send data are to be transmitted; and a second clock generating circuit for generating a second plurality of clocks having different phases with respect to each other, wherein said receive clock determining circuit selects one of said second plurality of clock generated by said second clock generating circuit according to the information representing the address from which the receive data are to be received.

17. A data transfer apparatus as claimed in claim 16, wherein the time elapsing from clock selection by said send clock determining circuit to reception of data by any destination of said transmitted data is constant regardless of destination.

18. A data transfer apparatus for transferring data over a signal line to a plurality of data transfer destinations, comprising:

a clock generator having an output of a plurality of clocks having different phases with respect to each other;

a clock selector having inputs that receive said plurality of clocks generated by said clock generator means, that selects one of said clocks for output therefrom; and a data sending circuit having an input that receives the selected clock, that sends the data according to the selected clock to one of said plurality of data transfer destinations.

19. A data transfer system in which a plurality of units are connected with each other by a bus line for transferring data, each unit sending and receiving data from another unit by said bus line, said plurality of units each comprising:

a clock generator having an output of a plurality of clocks having different respective phases;

a clock selector having inputs that receive said plurality of clocks generated by said clock generator means, that selects one of said clocks for output therefrom; and a data sending circuit having an input that receives the clock selected by said clock selector, that sends the data to a receiving unit of said plurality of units other than the unit sending the data.

20. A data transfer system according to claim 19, wherein said clock selector selects one of said plurality of clocks according to an address of the unit sending the data and an address of the receiving unit.

21. A data transfer system as claimed in claim 20, wherein the phase of each of the plurality of clocks generated by said clock generator has a direct correspondence to one of the plurality of units other than the unit generating the clock, such that phase delays of the phases of the clocks correspond inverse-proportionally to physical distances between the data sending circuit and each of the plurality of units other than the unit sending the data.

22. A data transfer system as claimed in claim 21, wherein time elapsing from clock selection by said clock selector to reception of data by said receiving unit is constant regardless of receiving unit.

23. A data transfer system as claimed in claim 20, wherein each unit further includes a data receiving circuit having an input that receives data sent by a data sending circuit from a unit other than the unit receiving the data.

* * * * *